Patented Jan. 25, 1949

2,460,074

UNITED STATES PATENT OFFICE 2,460,074

COBALT THIOCYANATE RELATIVE HUMIDITY INDICATORS

Paul Bell Davis, Baltimore, Md., assignor to The Davison Chemical Corporation, Baltimore, Md.

No Drawing. Application February 7, 1945, Serial No. 576,725

2 Claims. (Cl. 252—408)

This invention relates to indicators and more particularly has reference to compositions for indicating the presence and quantity of moisture in a gaseous atmosphere.

An object of this invention is to provide a composition for indicating the presence and quantity of moisture in a gaseous atmosphere within predetermined limits.

Another object of this invention is to provide a composition capable of exhibiting a definite color break when exposed to a gaseous atmosphere having a relative humidity ranging from about 20 to 40%.

A further object of this invention is to provide a moisture indicator formed of cobalt thiocyanate associated with an adsorbent carrier such as silica gel.

Still another object of this invention is to provide a moisture indicator formed of an adsorbent material such as silica gel having $Co(SCN)_2$ incorporated in the pores thereof, in which the adsorbent characteristics of the carrier, its moisture content, the color changing characteristics of the $Co(SCN)_2$ and its concentration are correlated to produce a definite break in the color of the indicator when exposed to a gaseous atmosphere having a predetermined relative humidity.

It is also an object of this invention to provide a method of making a color changing moisture indicator.

Other objects will appear from the following description:

In accordance with the present invention it has been found that by treating an adsorbent carrier such as silica gel with an aqueous solution of $Co(SCN)_2$ and drying the so treated carrier, an indicator gel is obtained which has a definite color and which upon exposure to a gaseous atmosphere such as air having a predetermined relative humidity will change its color.

It has also been found, in accordance with the present invention, that by correlating the adsorptive characteristics of the carrier, its final moisture content as fixed by the temperatures at which the impregnated carrier is dried, or dried and activated, and the concentration of cobalt thiocyanate in the carrier, the color of the resulting indicator before exposure to a humid atmosphere and also the color of the indicator after exposure to an atmosphere having a predetermined relative humidity can be adjusted or controlled.

The present invention is directed principally to moisture indicators formed of a carrier such as silica gel impregnated with cobalt thiocyanate and having a definite color change or break when exposed to a gaseous atmosphere such as air having a relative humidity in the range of 20 to 40%.

In preparing an indicator according to the present invention, a standard silica gel made by washing an acid reacting hydrogel with an acidic wash water at a temperature of about 150° F., drying and then activating at a temperature of about 850° F. and sized to about 6 to 16 mesh, was employed. The silica gel in the activated form was first treated by exposing it to a humid atmosphere having a high relative humidity to saturate the gel with moisture to such an extent that upon contacting it with a liquid it would not disintegrate as would be the case if freshly activated gel were contacted with a liquid.

After saturation with moisture to an approximate total volatile content of about 30%, the silica gel was impregnated with an aqueous solution of cobalt thiocyanate. It has been found that by first saturating the gel with moisture to the extent indicated, wetting of the gel with the $Co(SCN)_2$ solution can be effected by using about 50 ml. of solution per kilogram of gel. Of course, if necessary, more of the solution can be employed. The cobalt thiocyanate solution used was of such concentration and the quantity of solution per kilogram of gel was such that the gel had a $Co(SCN)_2$ content of about ¾% on a dry basis.

By drying the silica gel having a $Co(SCN)_2$ content of about ¾% at a temperature of about 250° F., an indicator was obtained which had a Munsell color value of about 7.5 PB 3/14. This indicator was found to be particularly suitable for the indication of the presence of moisture in a gaseous atmosphere such as air when the atmosphere had a relative humidity ranging between 20 and 40%. For instance, when this indicator gel was exposed to an atmosphere having a relative humidity of about 20%, the color of the indicator changed to about 10.0 PB 5/8 M. C. V. When the same indicator gel was exposed to an atmosphere having a relative humidity of about 40%, the color changed to about 7.5 RP 6/8 M. C. V.

By varying the concentration of the cobalt thiocyanate in the gel, the characteristics of the gel or the temperature at which the impregnated gel was dried or activated, a product was obtained which responded by changes in color when exposed to atmospheres having different relative humidities.

In the drying and activating of the above-mentioned gels, the same were held at the temperatures mentioned for about three hours.

While silica gel has been described as the carrier of the chromatic chemical, a porous glass may be used as described in my copending application, Serial No. 576,726 (now abandoned), filed of even date herewith. Such porous glass is made from a glass containing from 60 to 82% $SiO_2$, 20 to 35% $B_2O_3$ and 5 to 10% alkali oxide heat treated at a temperature of 525 or 600° C. to cause the glass to be separated into two phases, one of which is rich in boric oxide and alkali oxide and is soluble in acids, and the other of which is very rich in silica and substantially insoluble in acids. By treating the so heat treated glass with an acid such as hydrochloride, nitric or sulphuric acids maintained at a temperature at or near the boiling point thereof, the acid reacts with the alkaline phase of the glass forming a number of microscopic pores throughout the body thereof. This porous glass may be used in place of the silica gel hereinbefore mentioned.

The values given for the various colors in the foregoing description refer to the system of color notation devised by A. H. Munsell and published by Munsell Color Company, Inc., Baltimore, Maryland, as the Munsell Book of Color, abridged edition, revised 1942.

From the foregoing description, it will be appreciated that the present invention provides an indicator gel particularly suitable for the indication of the relative humidity of an atmosphere. It will also be appreciated that the present invention provides methods of preparing and utilizing indicator gels having color breaks when exposed to atmospheres of different relative humidities.

I claim:
1. A method of preparing a quantitative relative humidity indicator comprising impregnating activated silica gel with about ¾%, on a dry basis, of cobalt thiocyanate, and drying the impregnated silica gel at a temperature of about 250° F., said indicator changing color when exposed to an atmosphere having a relative humidity of 20–40%.

2. A quantitative relative humidity indicator consisting essentially of silica gel impregnated with about ¾%, on a dry basis, of cobalt thiocyanate, said indicator changing color when exposed to an atmosphere having a relative humidity ranging from 20 to 40% and being prepared by the method of claim 1.

PAUL BELL DAVIS.

REFERENCES CITED

The following references are of record in the file of this patent:

UNITED STATES PATENTS

| Number | Name | Date |
| --- | --- | --- |
| 1,947,381 | Connolly et al. | Feb. 13, 1934 |
| 1,976,875 | Connolly et al. | Oct. 16, 1934 |
| 2,210,862 | Tronstad | Aug. 6, 1940 |
| 2,214,354 | Snelling | Sept. 10, 1940 |

FOREIGN PATENTS

| Number | Country | Date |
| --- | --- | --- |
| 280,934 | Great Britain | Feb. 18, 1929 |
| 345,672 | Great Britain | Mar. 23, 1931 |
| 393,094 | Great Britain | June 1, 1933 |

OTHER REFERENCES

The Chemical Trade Journal and Chemical Engineer, July 14, 1939, page 31.